Patented Jan. 6, 1942

2,268,627

UNITED STATES PATENT OFFICE 2,268,627

WELL LOGGING

Daniel Silverman, Tulsa, Okla., assignor to Stanolind Oil and Gas Company, Tulsa, Okla., a corporation of Delaware No Drawing. Application October 6, 1939, Serial No. 298,293

10 Claims. (Cl. 73—51)

This invention relates to the logging of wells, particularly oil and gas wells to determine characteristics of the geological strata traversed by such wells. One type of well logging with which the art is familiar is conducted to determine the porosity of the formations traversing the well. Very simple methods of doing this are available when the porous formation contains salt water since by reducing the pressure of the fluids within the well, the salt water can be drawn into the well and its properties, for instance resistivity, can be measured by simple apparatus.

However, no thoroughly satisfactory method has been provided for determining permeability without reference, or largely without reference, to the type of fluid in the particular porous formations traversing the well which is being logged. Further it is desirable to have a logging method which will determine a combined function of porosity and permeability and no such method has been provided by the prior art.

It is an object of my invention to provide an improved well logging method for the determination of permeability. A more particular object of my invention is to provide a permeability logging method in which the measurement is largely independent of the fluids originally present in the porous formation. Another object of my invention is to provide a well logging method which will indicate permeability as well as porosity. Other and more detailed objects, advantages and uses of my invention will become apparent as the description thereof proceeds.

Wells are customarily drilled by the use of one type or another of drilling fluid, usually a so-called drilling mud. In most cases the density of this drilling fluid and/or the pressure imposed on it is about or just slightly above that sufficient to balance the pressure of sub-surface fluids encountered in porous strata. In practicing my invention, the pressure of the drilling fluid (or of another liquid present in the well) is increased by the application of pressure to the top of the liquid column to an extent sufficient to cause the drilling fluid or other liquid to enter the porous sub-surface formations to a very considerable extent, for instance pressures from 50 to 1000 pounds per square inch in excess of the normal hydrostatic pressure can be imposed.

Following this application of pressure, the drilling fluid or other liquid in the uncased or partially uncased well is replaced (while retaining the applied pressure) by another liquid having one or more properties measurably different from those of the original liquid. This replacement can most conveniently be accomplished by adding a constituent to the original liquid or by neutralizing a constituent which was present in the original liquid. When the liquid has been circulated, for instance by the normal drilling mud circulation system, to an extent necessary to substitute the modified liquid for that originally present, the pressure is substantially reduced with the result that the liquid which was forced into the porous formation re-enters the well to a considerable extent depending on the porosity and permeability of the strata.

This pressure reduction can usually best be accomplished by releasing the pressure applied to the top of the liquid column in the well.

At this point the actual logging operation is commenced. Logging can be accomplished by the measurement of any property; chemical, physical or physico-chemical property, in which there is a difference between the drilling fluid or other liquid originally used, and the new or modified liquid. By measuring some such property up and down the well, variations will be encountered, depending on the amount of the original drilling fluid which has entered the well from the porous strata. Thus a porosity and permeability log is obtained in which the indications are substantially pure functions of porosity and permeability and not functions of the various fluids normally present in the porous strata before the drilling operation.

As one example of a chemical property which can be used, a drilling mud having a fairly low hydrogen ion concentration (pH) can be used initially and after the well has been drilled to the desired extent and pressure has been applied to the drilling fluid to force the low pH mud into the porous strata, the mud can be recirculated at this excess pressure with the addition of an alkaline agent, for instance trisodium phosphate which will raise the pH. Having completed the circulation of the modified mud to replace the original mud in the well bore, the pressure can be reduced, thus bringing the initial low pH mud back into the well adjacent the porous strata. Then by running a pH meter up and down the well a log of pH versus depth can be obtained and low pH at a given depth will be an indication of high porosity and permeability of the stratum at that depth. Thus the pH measurements will show the presence and boundaries of porous and permeable strata as well as, roughly, the degree of permeability of those strata. Of course, instead of using a mud of low pH initially, a high pH mud can be used and then modified by the addition of acid so that high rather than low pH will be an indication of high porosity and permeability.

A very large list of other properties can be utilized in an equivalent manner; in fact any measurable property can be used. Thus a chemical agent can be added to the original drilling fluid, which can then be forced into the porous and permeable strata, the original liquid can be replaced (under pressure) with one free of the chemical agent, the pressure can be relieved and the presence of the chemical agent can then be determined as a function of depth. Alternatively the chemical agent can be added to the second liquid instead of the first in which case low concentrations determined in the logging operation will indicate porous and permeable strata. A still different method is to put one chemical in the first liquid and another chemical in the second liquid, the two being such as will react with each other to give a reaction product, the presence of which can be determined as a function of depth. For instance, barium chloride can be added to one of the liquids and sodium sulfate to the other; then when the pressure is released the two liquids will come in contact with each other and form a white precipitate of barium sulfate, the presence of which can be determined by running an instrument having a light source and a photoelectric cell up and down the hole.

Another method of accomplishing a similar result is to add a radioactive material to one or the other of the two liquids, preferably the first, and the logging operation can then be conducted by the use of a suitable counting mechanism known to the art.

While these methods which may be considered to be chemical or physico-chemical can be used, it is often more desirable to utilize a physical property. One of these is electrical conductivity or its reciprocal, resistivity. Thus after the well has been drilled and excess pressure has been applied to drive the mud back into the formation, a salt can be added to the mud to increase its conductivity. This mud can be circulated under the excess pressure, the pressure can be reduced and the conductivity can be measured. In this case low conductivity will be a function of high porosity and permeability. Alternatively the more conductive liquid can be used first.

Another property which can be used is density or specific gravity. Thus the original mud can be a relatively light one and after applying excess pressure to drive this mud back into the formation, a weighting agent can be added to it and the modified (heavier) mud circulated in the well. After the excess pressure is reduced by bailing or by reduction of applied pump or pneumatic pressure, the gravity can be measured throughout the well or some part of it, for instance by the use of the apparatus disclosed in patent application Serial Number 219,617 filed July 16, 1938, by Raymond T. Cloud and the gravity of the well fluids will be a function of the porosity and permeability.

Still another physical property which can be used to advantage is viscosity. It is well known that the viscosity of drilling fluids can be changed very materially by the use of collodial materials such as bentonite or by the use of certain viscosity reducing agents such as certain of the phosphates, particularly sodium hexametaphosphate. Thus a mud of one viscosity can be circulated, excess pressure can be applied to drive it back into the formation, the viscosity can be modified, the modified mud can be circulated under substantially the same excess pressure, the pressure can be reduced and the well can then be logged by the use of a continuous recording viscometer which is run slowly up and down the well.

It is best to start with a mud of low viscosity which will penetrate into the porous and permeable strata and then increase the viscosity of the mud before the pressure is relieved and the well is logged, but the more viscous mud can be used first. One type of viscosity logging apparatus which can be used to advantage is a screen vibrated in the mud by a reaction type vibrator supported by a heavy mass, the amplitude and/or frequency of the system being measured, for instance, by an instrument of the seismometer type. The amplitude in particular is a function of the viscosity of the fluids in which the vibrating screen is immersed. This type of mud viscosity tester can be used in well logging operations other than that above described and it can also be used in above-surface mud testing.

Having described my invention in connection with certain preferred embodiments thereof, I desire to make clear that these are by way of example and not by way of limitation and that various modifications within the scope of the appended claims will occur to those skilled in the art.

I claim:

1. In a method of logging a well, the steps which comprise filling at least a portion of said well with liquid, applying to said liquid a pressure in substantial excess of the normal hydrostatic pressure, substituting for the portion of said liquid remaining in said well, while retaining substantially said excess pressure, a second liquid having at least one property substantially different from the corresponding property of said first-mentioned liquid, then reducing the pressure on said second liquid to cause said first-mentioned liquid to re-enter said well opposite said porous and permeable strata and then measuring said property at various levels in said well.

2. In a method of logging a well, the steps which comprise filling at least a portion of said well with liquid, applying to said liquid a pressure at least about 50 pounds per square inch in excess of the normal hydrostatic pressure, substituting for the liquid remaining in said well, while retaining substantially said excess pressure, a second liquid having at least one property substantially different from the corresponding property of said first-mentioned liquid, then reducing the pressure on said liquid to cause said first-mentioned liquid to re-enter said well opposite said porous and permeable strata and then measuring said property at various levels in said well.

3. In a method of logging a well, the steps which comprise filling at least a portion of said well with liquid, applying to said liquid a pressure in substantial excess of the normal hydrostatic pressure to force a part of said liquid into porous and permeable strata traversed by said well, modifying at least one property of the liquid in said well without modifying the liquid which has been forced into said porous and permeable strata, then reducing the pressure on the liquid in said well to cause the unmodified liquid in said strata to re-enter said well and then measuring said property as a function of depth in said well.

4. In a method of logging a well, the steps which comprise filling at least a portion of said well with liquid, applying to said liquid a pressure from about 50 to about 1000 pounds per square inch in excess of the normal hydrostatic pressure to force a part of said liquid into porous and permeable strata traversed by said well, modifying at least one property of the liquid in said well wtihout modifying the liquid which has been forced into said porous and permeable strata, then reducing the pressure on the liquid in said well to cause the unmodified liquid in said strata to re-enter said well and then measuring said property as a function of depth in said well.

5. In a method of logging a well in which a drilling fluid is used, the steps which comprise applying to said drilling fluid in said well pressure sufficient to drive part of said drilling fluid a substantial distance into any porous and permeable strata traversed by said well, substituting for the drilling fluid remaining in said well a second drilling fluid having at least one property substantially different from the corresponding property of the original drilling fluid, then reducing said pressure to cause said original drilling fluid to re-enter said well opposite said porous and permeable strata and then measuring said property at various levels in said well.

6. A method of logging an uncased or partially uncased well in which a drilling fluid is present comprising applying to said drilling fluid pressure sufficient to drive part of said drilling fluid into porous and permeable strata traversed by said well, circulating a drilling fluid having a property different from the corresponding property of the original drilling fluid at a similar pressure to replace the original drilling fluid in said well, reducing said pressure to cause said original drilling fluid to re-enter said well opposite said porous and permeable strata and then measuring said property at various levels in said well.

7. A method for logging a well in which a drilling mud is present comprising applying to said drilling mud pressure sufficient to drive part of said drilling fluid into porous and permeable strata traversed by said well, modifying said drilling mud in at least one property thereof without changing the pressure sufficiently to increase or decrease substantially the amount of drilling mud present in said porous and permeable strata, then reducing said pressure to cause said original drilling mud to re-enter said well opposite said porous and permeable strata and then determining the depths and relative porosity and permeability of said strata by measuring said property of said drilling mud in said well as a function of depth.

8. A method of logging a well in which a liquid is present comprising applying to said liquid pressure sufficient to drive part of said liquid into porous and permeable strata traversed by said well, modifying the pH of said liquid while retaining substantially the same pressure, then substantially reducing said pressure to cause the original liquid to re-enter said well and measuring the pH of the liquids in said well as a function of depth.

9. A method of logging a well in which a drilling fluid is present comprising applying to said drilling fluid pressure sufficient to drive part of said drilling fluid into porous and permeable strata traversed by said well, modifying the viscosity of said drilling fluid in said well while retaining substantially the same pressure, substantially reducing said pressure to cause said original drilling fluid to re-enter said well and measuring the viscosity of the drilling fluids in said well as a function of depth.

10. A method of logging a well in which a drilling fluid is present comprising adding a detectable substance to said drilling fluid, applying to said drilling fluid pressure sufficient to drive part of said drilling fluid carrying said detectable substance into porous and permeable strata traversed by said well, removing said detectable substance at least in part from said well but not from the porous and permeable strata traversed by said well, reducing said pressure to cause said original drilling fluid carrying said detectable substance to reenter said well opposite said porous and permeable strata and then determining as a function of depth the presence of said detectable substance in said well.

DANIEL SILVERMAN.